US009175619B2

(12) United States Patent
Whitehead et al.

(10) Patent No.: US 9,175,619 B2
(45) Date of Patent: Nov. 3, 2015

(54) METHOD OF INFERRING START-UP MISFIRES DUE TO THE BUILD-UP OF ICE AND MELT WATER IN THE INTAKE SYSTEM OF A VEHICLE ENGINE

(71) Applicant: Ford Global Technologies, LLC, Dearborn, MI (US)

(72) Inventors: Joseph Patrick Whitehead, Belleville, MI (US); Craig Alan Smith, Lake Orion, MI (US); Timothy Robert Gernant, Ann Arbor, MI (US); Robert Sarow Baskins, Grass Lake, MI (US); Gregory Joseph Pawlak, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 13/940,133

(22) Filed: Jul. 11, 2013

(65) Prior Publication Data

US 2015/0019107 A1 Jan. 15, 2015

(51) Int. Cl.

| | |
|---|---|
| ***G01M 15/00*** | (2006.01) |
| ***F02D 35/00*** | (2006.01) |
| ***F02D 41/04*** | (2006.01) |
| *F02D 41/06* | (2006.01) |
| *F02D 41/18* | (2006.01) |
| *F02D 11/10* | (2006.01) |

(52) U.S. Cl.

CPC ................ *F02D 35/00* (2013.01); *F02D 41/04* (2013.01); *F02D 41/042* (2013.01); *F02D 41/062* (2013.01); *F02D 41/18* (2013.01); *F02D 2011/108* (2013.01); *F02D 2200/021* (2013.01); *F02D 2200/0414* (2013.01); *F02D 2200/1015* (2013.01); *F02D 2200/501* (2013.01)

(58) Field of Classification Search

CPC . F02D 35/00; F02D 41/04; F02D 2200/1015; F02D 2200/021; F02D 41/062; F02D 41/042; F02D 2200/501; F02D 2011/108; F02D 2200/0414; F02D 41/18

USPC ........ 73/114.02, 114.03; 123/406.14, 406.27, 123/406.53, 406.55, 406.7; 701/102–105, 701/111–115

See application file for complete search history.

(56) References Cited

U.S. PATENT DOCUMENTS

| | | | | |
|---|---|---|---|---|
| 8,170,772 | B2 | 5/2012 | Nagashima et al. | |
| 2012/0244994 | A1 | 9/2012 | Spix et al. | |
| 2014/0158089 | A1 * | 6/2014 | Glugla et al. | 123/403 |
| 2014/0283798 | A1 * | 9/2014 | Shimane | 123/568.12 |

* cited by examiner

*Primary Examiner* — Thomas Moulis
*Assistant Examiner* — Joseph Dallo
(74) *Attorney, Agent, or Firm* — Julia Voutyras; Alleman Hall McCoy Russell & Tuttle LLP

(57) ABSTRACT

Methods are provided for determining ice formation during cruising under cold weather conditions at the intake manifold or throttle body of an engine system and for enabling engine misfire diagnostics upon detection of dissipation of the formed ice.

20 Claims, 4 Drawing Sheets

METHOD OF INFERRING START-UP MISFIRES DUE TO THE BUILD-UP OF ICE AND MELT WATER IN THE INTAKE SYSTEM OF A VEHICLE ENGINE

TECHNICAL FIELD

The field of the invention relates to engine misfire.

BACKGROUND AND SUMMARY

During cruising conditions in cold weather, ice may form in the engine throttle body, intake manifold, and positive crankcase ventilation (PCV) valve. Engine exhaust gases may blow by the pistons into the crankcase and are then vented into the throttle body or intake manifold through the PCV valve. The exhaust gases may contain water vapor which may freeze, especially in trucks during cold weather cruising conditions where cold air sweeping across the engine compartment may keep the throttle body and intake manifold below freezing temperatures.

Ice may remain in the throttle body and intake manifold after engine shutoff. If ice remains during a subsequent engine start, it may melt and the resulting water may cause engine misfires until the water is cleared out. An onboard engine misfire diagnostic routine operated by the engine controller may then indicate a misfire fault requiring maintenance even though the engine was operating properly.

U.S. Pat. No. 8,170,772 and U.S. published patent application 2012/0244994 disclose inferring ice buildup based on temperature. In response to ice detection engine speed is increased to reduce engine sensitivity to poor air/fuel mixtures caused by melted ice and resulting misfire. The inventors herein have recognized, however, that these references do not address onboard engine misfire diagnosis and false misfire indications.

Another approach has been to infer ice buildup and then delay misfire diagnosis after engine start for a predetermined time to allow the ice to melt. The inventors herein have recognized that this approach may result in delaying misfire diagnosis unnecessarily after ice has melted and dissipated. In one aspect of the invention disclosed herein, the inventors have solved these problems by inferring whether ice has formed in the engine intake manifold or throttle body in response to engine operating parameters, inferring whether the ice has melted after an engine shutoff, then inferring whether the melted ice has dissipated, and enabling engine misfire diagnostics after engine start in response to the inference of dissipated melted ice. In this manner misfire diagnosis may not be delayed unnecessarily. Instead misfire detection will be delayed only after there is an actual indication or inference that there was ice which has melted, but not dissipated through evaporation and/or leakage through the manifold. Any delay in misfire diagnosis therefore only occurs when actually necessary and only for a minimal time.

In another aspect of the invention, the inventors estimate the amount of ice formed to further reduce the average delay of misfire diagnosis. In still another aspect of the invention, the inventors have facilitated ice melting and dissipation by coupling engine heat to the intake manifold or throttle body.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings.

DETAILED DESCRIPTION

Figure 1:
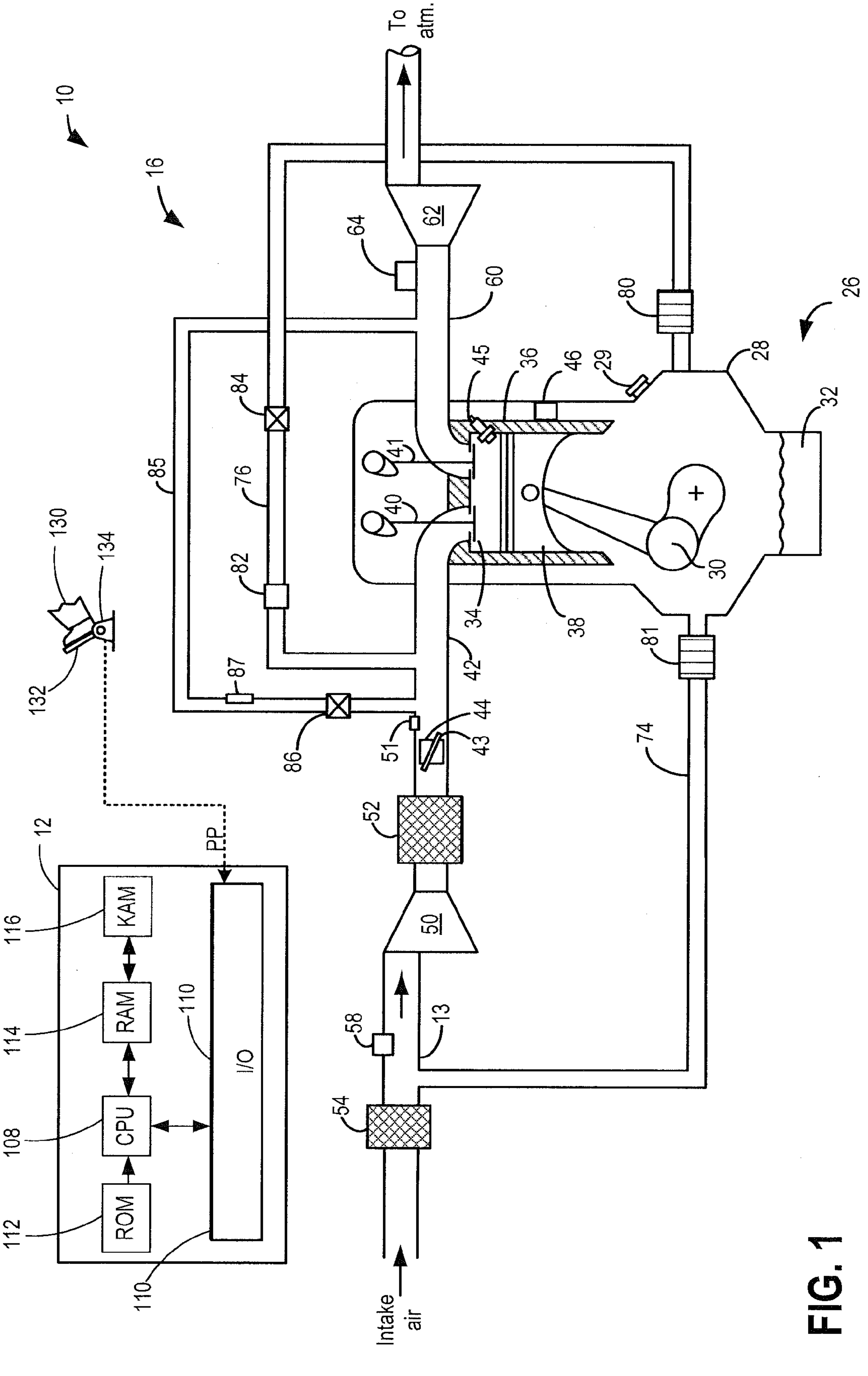
FIG. 1 shows a schematic depiction of an engine system coupled to a positive crankcase ventilation system.

The following description relates to systems and methods for inferring formation of ice, melting of ice, and dissipation of melted ice in an intake manifold, a throttle body, and/or a positive crankcase valve of an engine system, such as engine system of FIG. 1. A controller may perform a routine, such as the routine at FIG. 2 to enable or delay misfire diagnostics based on ice formation, melting, and dissipation. Further, the controller may perform a routine, such as the routine at FIG. 3, to determine an amount of ice formation, and to couple engine heat to the intake manifold, or throttle body, thereby facilitating melting and dissipation of ice. An example of adjusting misfire detection operation based on presence of ice, and melted ice is shown at FIG. 4.

Referring now to FIG. 1, it shows an example system configuration of a multi-cylinder internal combustion engine, generally depicted at 10, which may be included in a propulsion system of an automotive vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (that is cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 42 which is positioned downstream of a throttle body 44 having a throttle plate 43. The engine block 26 may also include an engine coolant temperature (ECT) sensor 46 input into an engine controller 12 (described in more detail below herein).

Throttle body 44 may be disposed in the engine intake to control the airflow entering intake manifold 42 and may be preceded upstream by compressor 50 followed by charge air cooler 52, for example. A throttle body temperature sensor (not shown) may be disposed in the throttle body to provide an indication of throttle body temperature. An air filter 54 may be positioned upstream compressor 50 and may filter fresh air entering intake passage 13. Further, a humidity sensor 51 configured to detect an ambient humidity may be disposed at the intake manifold. In one example, an exhaust gas sensor 64 (described below with respect to FIG. 1) such as an oxygen sensor may be configured to detect ambient humidity.

An intake manifold temperature sensor (not shown) may be disposed in the intake manifold to provide an indication of intake manifold temperature. In some example systems, a temperature sensor disposed in the intake manifold may provide an indication of intake air temperature, and intake manifold temperature may be estimated based on intake air temperature, and engine coolant temperature. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or vent tube 74. Crankcase ventilation tube 74 may be coupled to fresh air intake passage 13 upstream of compressor 50. In some examples, the crankcase ventilation tube may be coupled downstream of air cleaner 54 (as shown). In other examples, the crankcase ventilation tube may be coupled to intake passage 13 upstream of air cleaner 54.

PCV system 16 also vents gases out of the crankcase and into intake manifold 42 via a PCV conduit 76 (herein also referred to as PCV line 76). It will be appreciated that, as used herein, PCV flow refers to the flow of gases through conduit 76 from the crankcase to the intake manifold. Similarly, as used herein, PCV backflow refers to the flow of gases through conduit 76 from the intake manifold to the crankcase. PCV backflow may occur when intake manifold pressure is higher than crankcase pressure. In some examples, PCV system 16 may be equipped with means for preventing PCV backflow. In other examples, the occurrence of PCV backflow may be inconsequential, or even desirable; in these examples, PCV system 16 may exclude means for preventing PCV backflow, or may advantageously use PCV backflow for vacuum generation, for example.

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 42. Another oil separator 81 may be disposed in conduit 74 to remove oil from the stream of gases exiting the crankcases during boosted operation. Additionally, PCV line 76 may also include a vacuum sensor 82 coupled to the PCV system.

PCV system 16 may include one or more PCV valves 84 to regulate PCV flow in conduit 76. As described above, PCV flow regulation may be needed to ensure that flow requirements for proper crankcase ventilation are achieved, and to ensure that the air-fuel ratio in the intake manifold enables efficient engine operation.

Further, an exhaust gas recirculation (EGR) system may route a desired portion of exhaust gas from exhaust passage 60 to intake manifold 42 via high-pressure EGR (HP-EGR) passage 85 and/or low-pressure EGR (LP-EGR) passage (not shown). The amount of EGR provided to intake manifold 42 may be varied by controller 12 via HP-EGR valve 86 or LP-EGR valve (not shown). In some embodiments, a throttle may be included in the exhaust to assist in driving the EGR. Further, an EGR sensor 87 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and a crank speed sensor (not shown). Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a HP-EGR system where EGR is routed from upstream of a turbine of a turbocharger to downstream of a compressor of a turbocharger. Alternatively, a LP-EGR system where EGR is routed from downstream of a turbine of a turbocharger to upstream of a compressor of the turbocharger may be utilized. In another example, a combination of HP-EGR system and LP-EGR system may be used.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors coupled to engine 10, including measurement of inducted mass air flow (MAF) from mass air flow sensor 58; engine coolant temperature (ECT) from temperature sensor 46; throttle body temperature from throttle body sensor; PCV pressure from vacuum sensor 82; exhaust gas air/fuel ratio from exhaust gas sensor 64; etc. Furthermore, controller 12 may monitor and adjust the position of various actuators based on input received from the various sensors. These actuators may include, for example, throttle 44, intake and exhaust valve systems 40, 41. Storage medium read-only memory 112 can be programmed with computer readable data representing instructions executable by processor 108 for performing the methods described below, as well as other variants that are anticipated but not specifically listed. Example methods and routines are described herein with reference to FIGS. 2-4.

As described above, FIG. 1 shows only one cylinder of a multi-cylinder engine, and each cylinder may similarly include its own set of intake/exhaust valves, fuel injector, etc.

Figure 2:
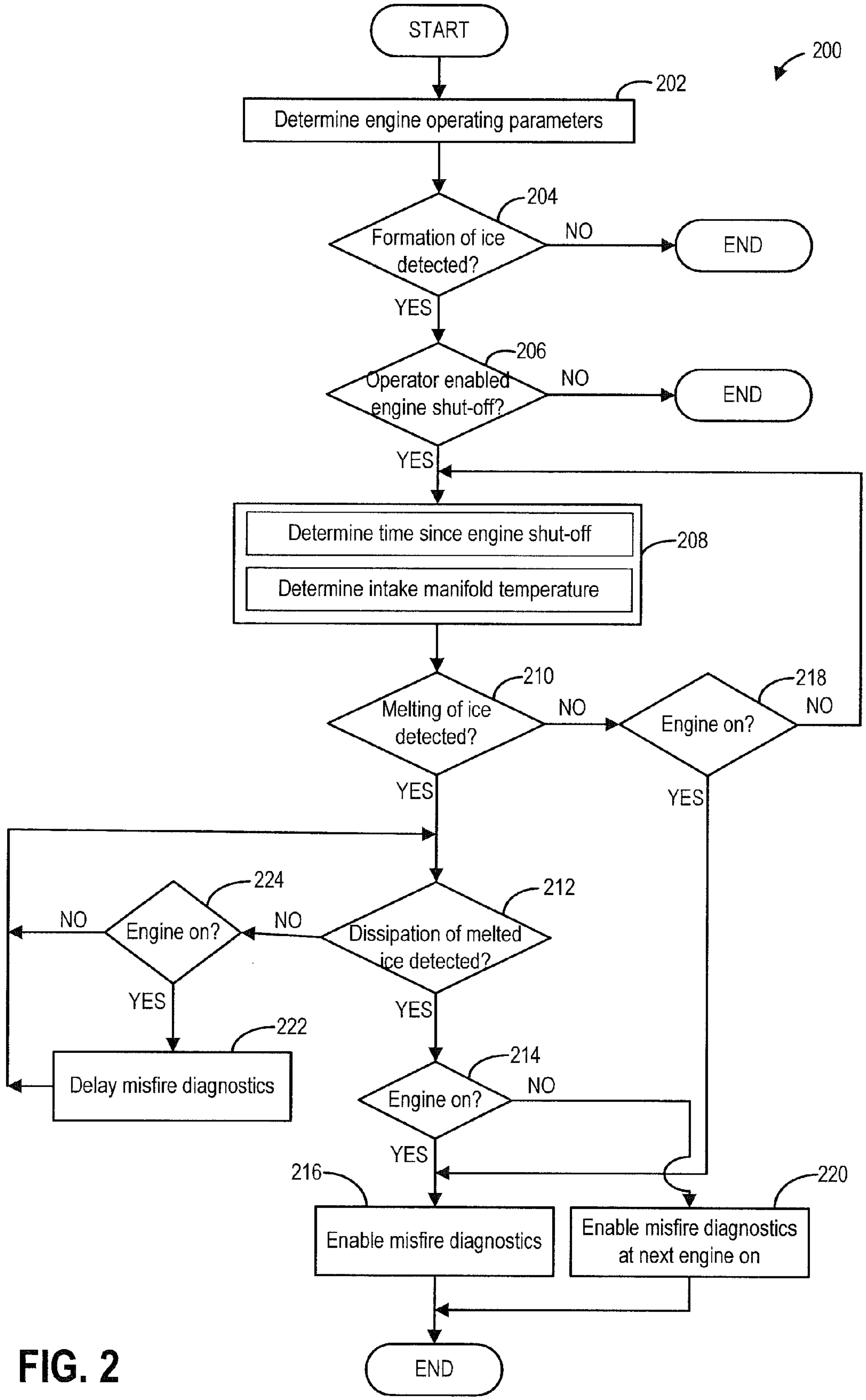
FIG. 2 shows a flow chart illustrating a routine for enabling or delaying misfire diagnostics based on ice formation, ice melting, and dissipation.

Turning to FIG. 2, an example method for detecting ice at an intake manifold and/or a throttle body, and adjusting misfire diagnostics based on melting and dissipation of ice is shown.

To reduce exhaust emissions, exhaust gases from the EGR path, and vapors from the PCV system may be vented into the intake manifold. The exhaust gases and vapors may contain water vapor which may freeze during engine operation in cold weather conditions causing ice to build-up in the intake manifold or throttle body. At 202, the controller may determine engine operating parameters to detect formation of ice at the intake manifold. Additionally, ice may form at the throttle body and/or the positive crankcase ventilation valve. Ice formation may occur during engine operation at low temperature during cold weather conditions, for example. Ice formation may be detected based on engine operating parameters including one or more of intake manifold temperature, engine coolant temperature, airflow inducted through the throttle body and intake manifold, cruising speed, duration of cruising speed, and EGR mass. For example, during conditions when the intake manifold (or the throttle body) is below freezing temperatures, a vehicle traveling downhill at a particular speed may vent lesser exhaust gases (from the EGR system and the PCV system) into the intake manifold and lesser airflow may be inducted through the intake manifold than a vehicle traveling uphill at the same speed, due to the engine operating at a higher load when traveling uphill. Consequently, due to more exhaust gases being vented into the intake manifold, and more air being inducted through the intake manifold when the vehicle is traveling uphill, more water vapor may pass through the intake manifold, and as a result, more ice formation may be detected. Therefore, ice formation may be detected based on engine operating parameters including intake manifold temperature, EGR mass, airflow, and cruising speed as discussed above. Further, an icing counter may be utilized as described herein with reference to FIG. 4 to detect ice formation.

Upon determining engine operating parameters at 202, at 204 the controller may determine if ice formation is detected. If yes, then the routine may proceed to 206 to determine if the engine operation has been shut-off in response to a command by an operator. If yes, upon detecting an engine shut-off operation, at 208 time elapsed since engine shut-off, and intake manifold temperature may be determined. Next, at 210, the controller may determine if melting of ice at the intake manifold or the throttle body is detected. Melting of ice may be determined based on duration of time since engine shut-off, and temperature of the intake manifold or the throttle body. For example, if the temperature of the intake manifold is above a predetermined threshold and the duration of time elapsed since engine shut-off is above a melting threshold, then it may be determined that water from melting ice may be present at the intake manifold or the throttle body.

It will be appreciated that engine shut-off conditions may vary based on the configuration of the vehicle system. For example, embodiments of engine shut-off conditions may vary for hybrid-drive enabled vehicle systems, non-hybrid-drive enabled vehicle systems, and push-button engine start-enabled vehicle systems. It will be appreciated, however, that the engine shut-off conditions referred to herein are one-to-one equivalent to vehicle-off conditions.

As a first example, in vehicles configured with an active key, a vehicle-off condition may include a key-off condition. As such, in active key-based vehicle configurations, the active key is inserted into a keyhole to move the position of a keyhole slot between a first position corresponding to a vehicle-off condition, a second position corresponding to a vehicle-on condition, and a third position corresponding to a starter-on condition. To start cranking the vehicle engine, the key is inserted in the keyhole and the slot is moved from the first position to the third position via the second position. A vehicle-off event occurs when the active key is used to return the slot from the third position to the first position, followed by removal of the key from the slot. In response to the slot being returned to the first position and the active key being removed, an engine-off as well as a vehicle-off condition is indicated.

As a second example, in vehicles configured with start/stop button, a vehicle-off condition may include a stop button actuated condition. In such embodiments, the vehicle may include a key that is inserted into a slot, as well as an additional button that may be alternated between a start position and a stop position. To start cranking the engine, the vehicle key is inserted in the keyhole to move the slot to an “on” position and additionally the start/stop button is pushed (or actuated) to the start position to start operating the engine starter. Herein, a vehicle-off condition is indicated when the start/stop button is actuated to the stop position As a third example, in vehicles configured with a passive key, a vehicle-off condition may include the passive key being outside a threshold distance of the vehicle. The passive key may include an ID tag, such as an RFID tag, or a wireless communication device with a specified encrypted code. In such embodiments, in place of an engine keyhole, the passive key is used to indicate the presence of a vehicle operator in the vehicle. An additional start/stop button may be provided that can be alternated between a start position and a stop position to accordingly start or stop the vehicle engine. To start running the engine, the passive key must be present inside the vehicle, or within a threshold distance of the vehicle) and the button needs to be pushed (actuated) to a start position to start operating the engine starter. A vehicle-off (and also engine-off) condition is indicated by the presence of the passive key outside the vehicle, or outside a threshold distance of the vehicle.

Upon detecting the presence of water from melting ice, at 212 the controller may determine if dissipation of melted ice may be detected. Dissipation of melted ice may occur by means of evaporation and/or leakage, for example and the dissipation may be determined based on duration of time elapsed since engine shut-off and intake manifold temperature. For example, if the duration of time since shut-off is greater than a dissipation threshold, and if the temperature of the intake manifold is above a threshold, the controller may determine that dissipation of melted ice has occurred. The dissipation threshold may be greater than melting threshold to allow sufficient time for dissipation of melted ice.

If at 212 dissipation of melted ice is detected, the controller may proceed to 214, where it may be determined if an engine-on condition has occurred. The engine-on condition may be an operator enabled engine-on event. Upon determining an engine-on event subsequent to detecting dissipation of melted ice, the controller may enable misfire diagnostics at 216. In the absence of an engine-on event immediately following the detection of dissipation of melted ice, the controller may store instructions to enable misfire diagnostics at a next engine-on event. In this way, by detecting dissipation of melted ice and enabling misfire diagnostics at a next immediate engine-on event, delay of misfire diagnostic routine may be prevented.

Returning to 210, if water from melted ice is not detected, the routine may proceed to 218 to determine if engine-on event has occurred. For example, duration of time elapsed since the engine-off event may not be greater than the melt threshold. As a result, melting of ice may not be detected. If at 218, an engine-on event is detected, the controller may proceed to 216 to enable misfire diagnostics. In this way, if melted ice is not detected, unnecessary delay of misfire detection may be prevented. If an engine-on event is not detected at 218, the controller may recalculate time elapsed since engine shut-off and intake manifold temperature and the routine may proceed as discussed above from step 208.

Returning to 212, upon detection of water from melted ice, if dissipation of melted ice is not detected, the routine may proceed to 224 to determine if an engine-on event has occurred. For example, if the duration of time elapsed since engine shut-off is not greater than a dissipation threshold, it may be determined that the melted ice has not dissipated indicating that water from melted ice may be present at the intake manifold or throttle body. Consequently, upon detection of presence of water from melted ice, if an engine-on event is detected at 224, the controller may delay misfire diagnostics at 222 to prevent onboard diagnostics from detecting potential misfire due to water from melted ice. In one example, the controller may delay misfire diagnostics for a predetermined time. In another example, the controller may delay misfire diagnostics until dissipation of melted ice is detected. If at 224, an engine-on event is not detected, the controller may return to step 212.

In this way, based on engine operating parameters formation of ice may be detected. Subsequently, based on duration of time since engine shut-off and intake manifold temperature, melting and dissipation of ice may be detected. Upon detecting melting of ice, and subsequently detecting dissipation of melted ice, misfire diagnostics may be enabled. Further, misfire diagnostics may be enabled during conditions when melting of ice is not detected. However, misfire diagnostics may be delayed when formed ice is melted but not dissipated. Therefore, misfire diagnostics are delayed only when water from melted ice is present in the intake manifold. In this way, by delaying misfire diagnostics only when melted ice water is present in the intake manifold, delay in misfire diagnostics may be reduced.

Figure 3:
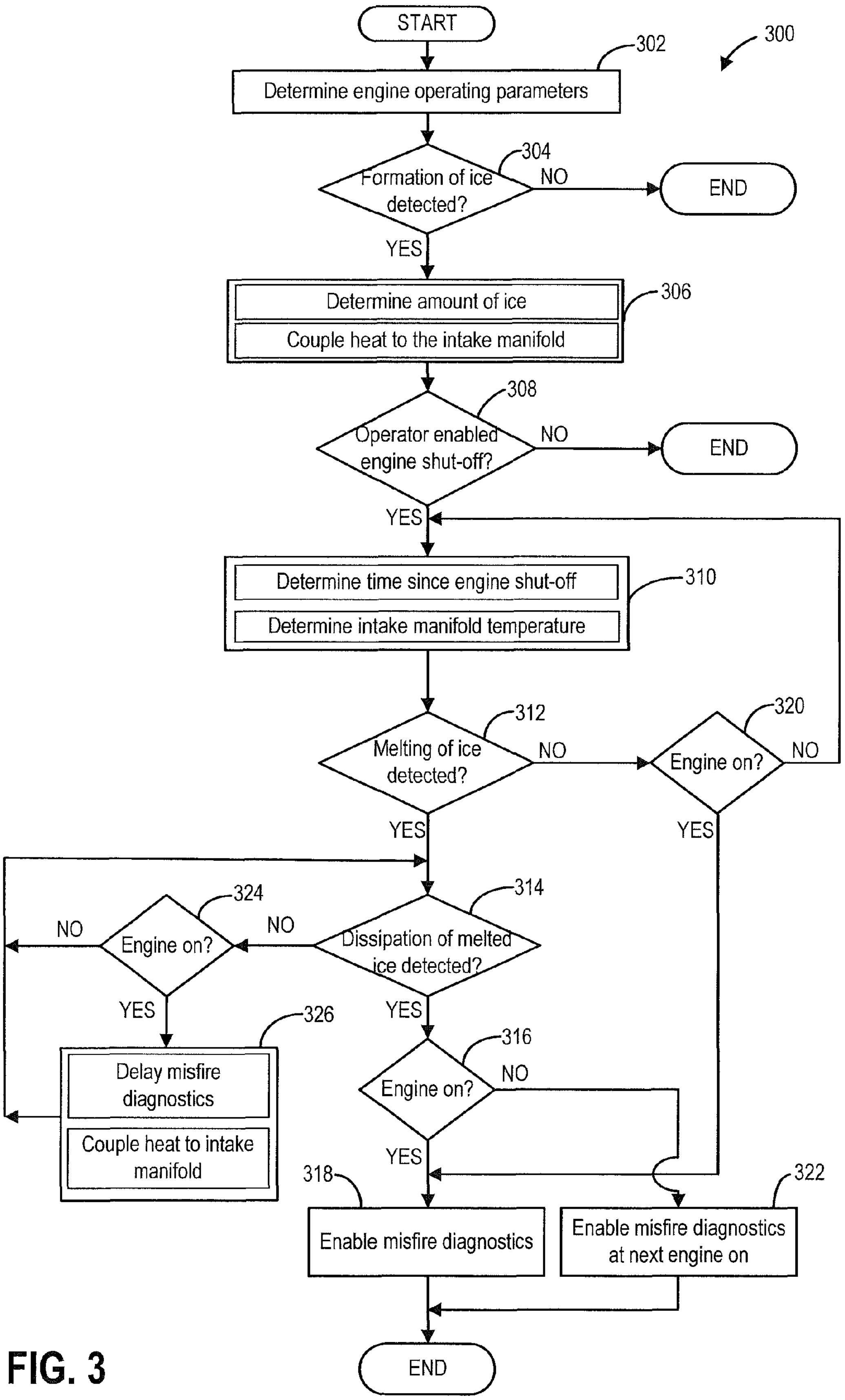
FIG. 3 shows a flow chart illustrating a routine for facilitating ice melting, and dissipation.
Figure 4:
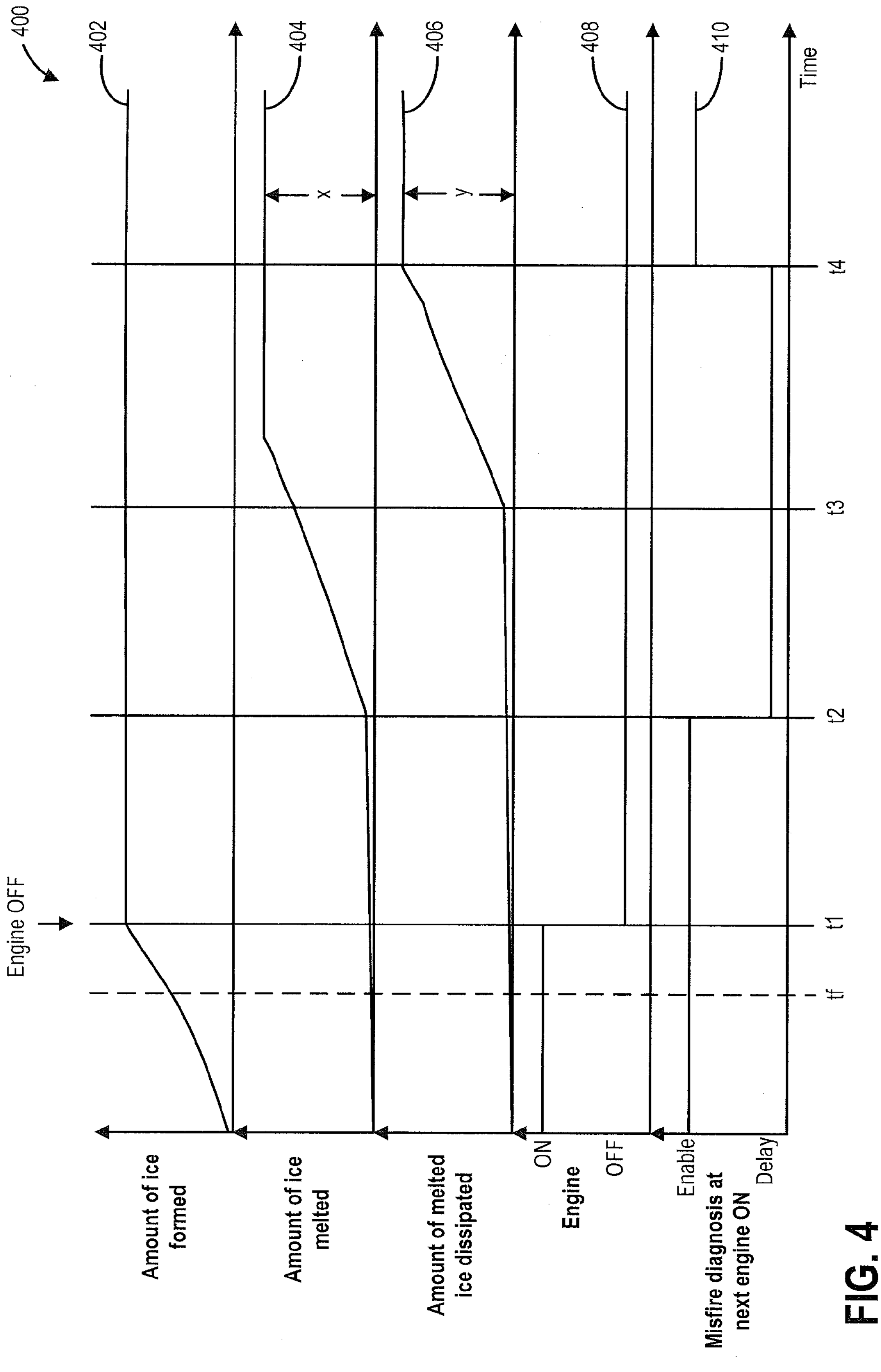
FIG. 4 shows an example operation, such as, enablement or delay of misfire diagnosis based on ice formation, melting, and dissipation.

Turning to FIG. 3, an example method for detecting ice at the intake manifold and/or the throttle body, and coupling heat to the intake manifold and/or throttle body to facilitate melting and dissipation of ice is shown.

At 302, the controller may determine engine operating parameters to detect formation of ice. Ice formation may occur during engine operation at low temperature during cold weather conditions, for example. Ice formation may be detected based on engine operating parameters including one or more of intake manifold temperature, engine coolant temperature, airflow inducted through the throttle body, cruising speed, duration of cruising speed, and EGR mass. At 304, the controller may determine if ice has formed at the intake manifold. In one example, ice formation may be detected at the throttle body. In another example, ice formation may be detected in the PCV system, such as at the PCV valve and/or at the PCV conduit. In still another example, ice formation may be detected at the intake manifold, throttle body, and PCV system.

Next, at 306, the controller may determine an amount of ice formed, and may couple heat to the intake manifold to facilitate melting and dissipation of ice. Amount of ice formed may be determined based on one or more of intake manifold temperature, engine coolant temperature, throttle body temperature, air flow inducted through the throttle body, EGR mass, engine speed, vehicle speed, and duration of vehicle speed. Ambient humidity may be another input.

One approach to estimating the amount of ice formed is to integrate mass airflow through the throttle body because water vapor from combusted gasses inducted into the engine via the PCV valve is related to the mass of air and fuel combusted in the engine. The engine operates at a predetermined stoichiometric air/fuel ratio so measuring the mass of inducted air is related to the mass of air and fuel combusted by the engine and, accordingly, the amount of water vapor generated. Further, the integral of mass airflow may be multiplied by a scalar related to one or more of: temperature, ambient humidity, engine coolant temperature, and cruising speed.

Upon detection of formation of ice, the controller may execute instructions to couple heat to the intake manifold. Heat may be coupled to the intake manifold from the engine system during an engine operation. In some examples, heat may be coupled at the start of the engine. The amount and duration of heat coupling may be based on the amount of ice formed at the intake manifold or throttle body or PCV system. Further, the amount and duration of heat coupling may be based on dissipation of melted ice. For example, if it is determined that melted ice has not dissipated; heat may be coupled to the intake manifold to facilitate faster dissipation of melted ice. In one example, heat for coupling may be derived from a heat exchanger coupled to a turbocharger air compressor. In another example, heat for coupling may be derived from an engine cooling system.

Upon detecting formation of ice and determining amount of ice formed, at 308 the controller may infer if an engine shut-off operation has occurred. If yes, the routine may proceed to 310. The engine shut-off operation may occur in response to a shut-off command by an operator, for example. At 310, the controller may calculate duration of time since engine shut-off, and may determine intake manifold temperature. In one example, intake manifold temperature and throttle body temperature may be determined. The intake manifold temperature (or the throttle body temperature) may be based on ambient temperature, and nature of the material with which the intake manifold (or the throttle body) is manufactured, for example. Additionally, intake manifold temperature may be based on engine coolant temperature and air flow inducted through the intake manifold.

Next, at 312, the controller may infer if melting of ice may be detected based on amount of ice formed, coupling of heat to the intake manifold prior to operator enabled engine shut-off, duration of engine shut-off, and intake manifold temperature. Upon inferring melting of ice, the controller may proceed to 314 to determine if dissipation of melted ice is detected. Dissipation of melted ice may be determined based on amount of ice formed, coupling of heat to the intake manifold prior to operator enabled engine shut-off, duration of engine shut-off, and intake manifold temperature. If dissipation of melted ice is not detected at 314, the controller may determine if the engine is turned on at 324. If yes, at 326 due to the presence of melted ice and absence of dissipation of melted ice the controller may delay misfire detection for a predetermined duration. In one example, the controller may delay misfire diagnostics until dissipation of melted ice is detected. Further, the controller may couple heat to the intake manifold at engine start to facilitate dissipation of melted ice. If at 324, the engine is not turned on, the controller may return to 314 to determine dissipation of melted ice.

Returning to 314, if dissipation of melted ice is detected, the controller may determine if an engine-on event has occurred at 316. If yes, due to dissipation of melted ice (determined at 314), at 318 the controller may enable misfire diagnostics without any delay. Since melted ice has been dissipated during the duration of engine shut-off, heat from the engine may not be coupled to the intake manifold. If engine-on event is not detected at 316, the controller may store instructions to enable misfire diagnostics at next engine-on event. Further, at next engine-on event, since dissipation of melted ice has been detected during the duration of engine shut-off, heat may not be coupled to intake manifold.

Returning to 312, if melting of ice is not detected, the controller may proceed to 320 to determine if an engine-on event has occurred. If yes, due to absence of melted ice misfire diagnostics may be enabled without delay. Since melting of ice is not detected during the duration of engine shut-off, heat may not be coupled to the intake manifold. If the engine-on event has not occurred, the routine may return to 310 to recalculate time since engine shut-off and intake manifold temperature. The routine may proceed further from 310 as discussed above.

In this way, misfire diagnostics may be enabled, thereby preventing unnecessary delays in misfire diagnosis, during conditions when dissipation of melted ice is detected, or in absence of melted ice. Further, by coupling heat to the intake manifold upon detection of formation of ice, melting and dissipation of ice may be facilitated, and delays in misfire diagnosis may be reduced.

Turning to FIG. 4, an example of reducing delay in misfire diagnosis during ice forming conditions is shown. Specifically graph 400 shows amount of ice formed at plot 402, amount of ice melted at plot 404, amount of melted ice dissipated at plot 406, engine condition (ON or OFF) at 408, and enablement or delay of misfire diagnostics at plot 410. The graph is plotted with time along x-axis.

Prior to t1, engine may be turned on (plot 408) and a vehicle may be cruising under cold weather conditions causing ice to build up at the intake manifold or throttle body. Consequently, an amount of ice formed at the intake manifold or the throttle body (plot 402) may increase as the vehicle operates in cold weather conditions. After a predetermined duration of time tf has elapsed with the vehicle operating in icing conditions, it may be determined that ice formation has occurred at the intake manifold or throttle body. Duration of time the vehicle operates in icing conditions may be monitored by an icing timer. For example, the icing timer may count up when an intake manifold temperature is below a first predetermined temperature threshold (that is, when low intake manifold temperature may cause water to freeze in the intake manifold), and the icing timer may count down when the intake manifold temperature is above a second predetermined temperature threshold (that is when the intake manifold temperature may cause the ice formed in the to melt). Upon reaching a predetermined threshold (such as tf in this example), it may be determined that ice is formed.

In one example, ice formation and amount of ice formed may be determined based on one or more of intake manifold temperature, engine coolant temperature, throttle body temperature, air flow inducted through the throttle body, EGR mass, engine speed, vehicle speed, and duration of vehicle speed, and a humidity sensor.

Further, prior to tf, due to absence of melt water (plot 404), misfire diagnosis may not be delayed. Between tf and t1, the vehicle may continue operating in cold weather conditions with the engine-on (plot 408) and ice may continue to accumulate at the intake manifold or the throttle body (plot 402). As the engine continues to operate in cold weather conditions, exhaust gases from the PCV system and the EGR system may continue to be vented into the intake manifold. As a result, the water vapor in the exhaust gases may cause ice to form and build up at the intake manifold or throttle body.

At t1, an engine-off event may occur in response to a command by an operator. Between t1 and t2, the engine may continue to be shut-off. Further, between t1 and t2, due to the duration of engine shut-off being less than a melting threshold t2, melting of ice may not be detected (plot 404). Consequently, if an engine-on event occurs during the duration between t1 and t2, the controller may enable misfire diagnosis without any delay. In other words, in the absence of melting of ice, at the next engine start event, engine misfire diagnosis may not be delayed (plot 410). In some examples, melting of ice may be determined based on intake manifold temperature or throttle body temperature, in addition to the duration of engine shut-off.

Between t2 and t3, amount of ice melted may continue to increase (plot 404) as the duration of engine shut-off increases (that is, the engine remains in a shut-off condition as shown at plot 408). However, between t2 and t3, melt water from melting ice may not be dissipated due to the duration of engine shut-off being less than a dissipation threshold t3. Consequently, due to the presence of melt water in the intake manifold or the throttle body, if an engine-on event occurred between t2 and t3, the controller may delay misfire diagnosis. In one example, misfire diagnostics may be delayed for a predetermined duration of time. In another example, misfire diagnostics may be delayed until dissipation of melt water is detected.

At t3, a dissipation threshold may be reached and consequently, melt water may start to dissipate. Dissipation may occur by means of evaporation and/or leakage from the intake manifold. In one example, dissipation may be determined based on amount of ice formed, duration of engine shut-off, and intake manifold temperature. Further, at t3, ice may continue to melt (plot 404) and the engine may continue to remain in an off state (408). If an engine-on event occurred at t3, due to present of melt water, misfire diagnosis may be delayed (plot 410). Between t3 and t4, amount of dissipated ice may increase (406). Additionally, amount of melt water may increase and subsequently, amount of melt water may equal amount of ice formed (plot 404). However, since melt water may not be dissipated completely between t3 and t4 (that is, amount of melt water not being equal to amount of melt water dissipated), melt water may be present in the intake manifold or throttle body. Consequently, if an engine-on event occurred between t3 and t4, the controller may delay misfire diagnosis (plot 410) due to the presence of melt water in the intake manifold or the throttle body.

Next, at t4, amount of melt water may equal amount of ice dissipated (X=Y, plots 404 and 406). In other words, melt water may be dissipated completely. Consequently, due to absence of melt water, if an engine-on event occurred at duration t4 and beyond, the controller may enable misfire diagnosis without delay. Therefore, even though formation of ice may be inferred at an engine-off event, upon inference of dissipation of melt water during the engine-off event, engine misfire diagnostics may be enabled at a subsequent engine-on event. Similarly, upon inferring the formation of ice at an engine-off event, if melting of ice is not detected for the duration of engine shut-off, engine misfire diagnostics may be enabled at a subsequent engine-on event. Only upon inferring the presence of melt water, engine misfire diagnostics may be delayed. In this way, unnecessary delay in misfire diagnostics may be prevented and total delay in misfire diagnostics may be reduced.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine, comprising:

inferring whether ice has formed in the engine intake manifold or throttle body in response to engine operating parameters;

shutting off the engine in response to an operator action;

inferring whether said ice has melted after said engine shutoff;

inferring whether said melted ice has dissipated; and enabling engine misfire diagnostics after engine start in response to said inference of dissipated melted ice.

2. The method recited in claim 1 wherein said engine operating parameters consist of one or more of the following: intake manifold temperature; engine coolant temperature; airflow inducted through said throttle body; and cruising speed, and duration of said cruising speed, of a vehicle propelled by the engine.

3. The method recited in claim 1 wherein said inference of melted ice is responsive to time since said engine shutoff and temperature of said intake manifold or throttle body.

4. The method recited in claim 1 wherein said inference of dissipated melted ice is responsive to time since said engine shutoff and temperature of said intake manifold or throttle body since said engine shutoff.

5. The method recited in claim 4 wherein said inference of dissipated melted ice is further responsive to temperature of said intake manifold or throttle body during engine operation before said engine shutoff.

6. The method recited in claim 1 wherein said dissipation of melted ice comprises evaporation and leakage.

7. The method recited in claim 1 further comprising coupling a positive crankcase ventilation valve from the engine crankcase to said intake manifold.

8. A method for controlling an engine propelling a motor vehicle, comprising:

estimating an amount of ice formed in the engine intake manifold or throttle body in response to engine operating parameters;

shutting off the engine in response to an operator action;

determining whether said amount of ice has melted after said engine shutoff;

determining whether said melted ice has dissipated; and disabling engine misfire diagnostics after an engine start in response to said determination that said ice has melted but not dissipated.

9. The method recited in claim 8 wherein said engine operating parameters consist of one or more of the following: intake manifold temperature; engine coolant temperature; mass airflow inducted through said throttle body; cruising speed, and duration of said cruising speed, of the vehicle; ambient humidity, and an estimate of the amount of ventilated gases through a PCV valve into the manifold.

10. The method recited in claim 8 wherein said dissipation of melted ice comprises evaporation and leakage from said intake manifold.

11. The method recited in claim 8 wherein said determination of melted ice is responsive to time since said engine shutoff and temperature of said intake manifold or throttle body.

12. The method recited in claim 8 wherein said determination of dissipated melted ice is responsive to time since said engine shutoff and temperature of said intake manifold or throttle body since said engine shutoff.

13. A method for controlling an engine propelling a motor vehicle, comprising:

estimating an amount of ice formed in the engine intake manifold or throttle body in response to engine operating parameters;

shutting off the engine in response to an operator action;

determining whether said ice has melted after said engine shutoff;

determining whether said melted ice has dissipated;

coupling heat to said throttle body or intake manifold to aid in ice melting and dissipation; and enabling engine misfire diagnostics after engine start in response to said melting and dissipation of said ice.

14. The method recited in claim 13 wherein said engine operating parameters consist of one or more of the following: intake manifold temperature; engine coolant temperature; mass airflow inducted through said throttle body; cruising speed, and duration of said cruising speed, of the vehicle; and an estimate of the amount of ventilated gases through a PCV valve into the manifold.

15. The method recited in claim 13 wherein said coupling heat to said intake manifold or throttle body comprises coupling heat from a heat exchanger that is coupled to a turbocharger air compressor.

16. The method recited in claim 13 wherein said coupling heat to said manifold or throttle body comprises coupling heat from an engine cooling system.

17. The method recited in claim 13 wherein said coupling heat to said manifold or throttle body occurs during engine operation when operating parameters indicate ice may be forming.

18. The method recited in claim 13 wherein said coupling heat to said manifold or throttle body occurs at engine start in response to said determination of melted ice that has not dissipated.

19. The method recited in claim 13 wherein said inference of melted ice is responsive to time since said engine shutoff and temperature of said intake manifold or throttle body.

20. The method recited in claim 13 wherein said inference of dissipated melted ice is responsive to time since said engine shutoff and temperature of said intake manifold or throttle body since said engine shutoff.

* * * * *